(12) United States Patent
Ueno

(10) Patent No.: US 7,513,525 B2
(45) Date of Patent: Apr. 7, 2009

(54) PASSENGER PROTECTING SYSTEM

(75) Inventor: Yukiyasu Ueno, Nishio (JP)

(73) Assignee: Denso Corporation, Kariya (JP)

( * ) Notice: Subject to any disclaimer, the term of this patent is extended or adjusted under 35 U.S.C. 154(b) by 312 days.

(21) Appl. No.: 11/489,882

(22) Filed: Jul. 20, 2006

(65) Prior Publication Data

US 2007/0024037 A1 Feb. 1, 2007

(30) Foreign Application Priority Data

Jul. 28, 2005 (JP) .............................. 2005-219384

(51) Int. Cl.
*B60L 3/00* (2006.01)

(52) U.S. Cl. .................... 280/735; 701/46; 307/10.1; 340/436

(58) Field of Classification Search ................ 280/735; 701/45, 46; 307/10.1; 340/436
See application file for complete search history.

(56) References Cited

U.S. PATENT DOCUMENTS

| | | | |
|---|---|---|---|
| 5,037,129 A | 8/1991 | Fritz et al. | |
| 5,208,484 A | 5/1993 | Okano et al. | |
| 5,338,062 A | 8/1994 | Kiuchi et al. | |
| 5,609,358 A * | 3/1997 | Iyoda et al. | 280/735 |
| 5,746,444 A | 5/1998 | Foo et al. | |
| 5,904,723 A | 5/1999 | Kiribayashi et al. | |
| 5,995,892 A | 11/1999 | Kiribayashi et al. | |
| 6,005,479 A | 12/1999 | Ide | |
| 6,216,070 B1 | 4/2001 | Hayashi et al. | |
| 6,256,564 B1 | 7/2001 | Miyaguchi et al. | |
| 6,292,728 B1 | 9/2001 | Masegi | |
| 2004/0176892 A1 | 9/2004 | Kumazawa | |
| 2005/0155805 A1 | 7/2005 | Takeuchi et al. | |
| 2006/0080495 A1 | 4/2006 | Glaser et al. | |

FOREIGN PATENT DOCUMENTS

| | | |
|---|---|---|
| DE | 101 08 848 | 9/2001 |
| DE | 101 08 850 | 9/2001 |
| DE | 101 08 849 | 10/2001 |
| GB | 2 374 186 | 10/2002 |
| JP | 2001-151053 | 6/2001 |

OTHER PUBLICATIONS

UK Search Report dated Nov. 30, 2006 in Gt. Britain Application No. GB 0613867.1.
DE Examination Report in Corresponding Application No. 10 2006 036 861.4-21 Dated Mar. 12, 2007.

* cited by examiner

*Primary Examiner*—Ruth Ilan
*Assistant Examiner*—Drew J. Brown
(74) *Attorney, Agent, or Firm*—Harness, Dickey & Pierce, PLC

(57) ABSTRACT

A passenger protecting system is provided with at least two sensors which detect an impact to a vehicle, a determining unit for determining a collision with the vehicle based on detection signals of the sensors, and a communication unit through which the sensors are connected with the determining unit so that the detection signals of the sensors are transmitted to the determining unit. The detection signal of one of the sensors has a reverse polarity with respect to that of other of the sensors. Thus, the determining unit can be restricted from a faulty determination due to a fault of the communication path or the sensors, so that a misoperation of the passenger protecting system can be reduced.

11 Claims, 5 Drawing Sheets

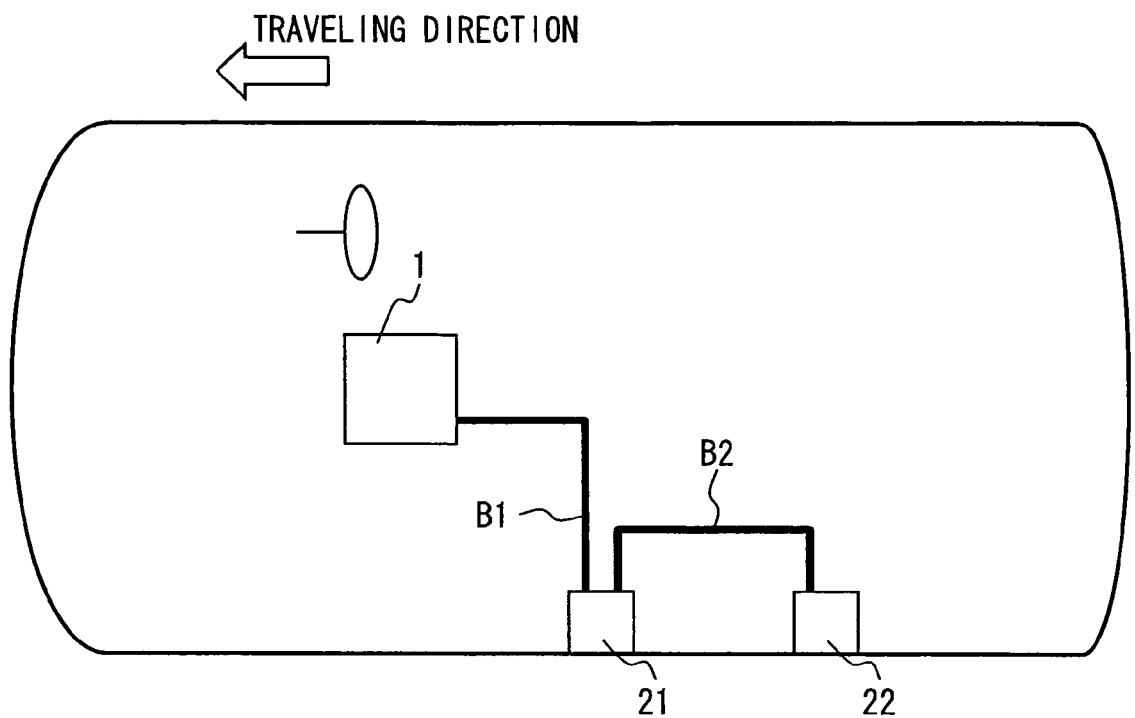
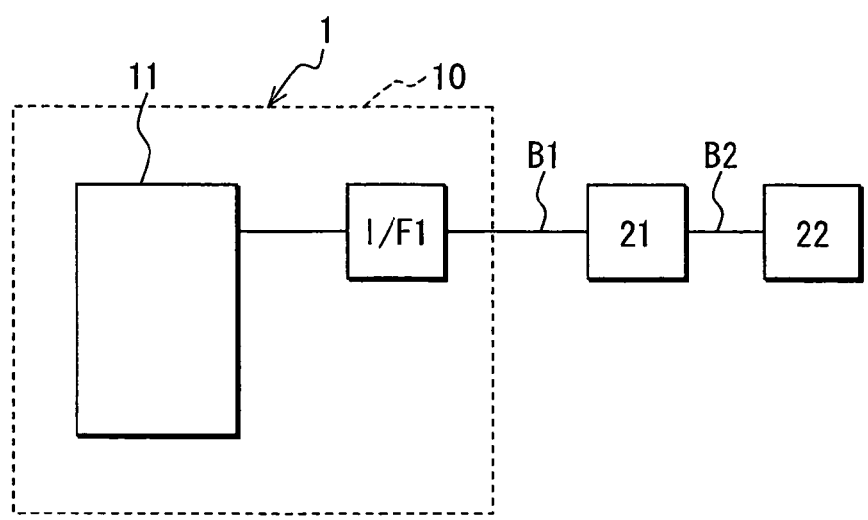

PASSENGER PROTECTING SYSTEM

CROSS REFERENCE TO RELATED APPLICATION

This application is based on a Japanese Patent Application No. 2005-219384 filed on Jul. 28, 2005, the disclosure of which is incorporated herein by reference.

FIELD OF THE INVENTION

The present invention relates to a passenger protecting system for protecting a passenger from a collision.

BACKGROUND OF THE INVENTION

Generally, a vehicle is provided with a passenger protecting system for protecting a passenger in a collision of the vehicle. The passenger protecting system has, for example, an airbag which is deployed in the collision to protect the passenger. It is desirable for the passenger protecting system to protect the passenger from not only the collision in the vehicle front-rear direction but also the collision (i.e., side-impact collision) in the vehicle lateral direction.

For example, referring to JP-B2-3011092 and JP-A-11-180249, the passenger protecting system for the vehicle has multiple sensors for detecting the collision and a determining unit for determining the collision with the vehicle based on signals from the sensors. When the determining unit determines that the collision occurs, a protecting unit such as the airbag and a pretensional will be actuated.

In this case, the sensors which are respectively mounted at different positions of the vehicle are connected with the determining unit, respectively via communication paths each of which is constructed of a communication wire and an interface circuit (I/F circuit). The communication paths are independent of each other. That is, the multiple sensors are connected with the determining unit in a one-to-one manner. In the case where there occurs an abnormality in one of the communication paths, a fluctuation due to the abnormality will be limited to the detection signal of the one sensor which is connected with this communication path.

However, in this case, when the number of the sensors is increased to improve the determining accuracy, the I/F circuit is to be added. Thus, the determining unit is big-sized so that the vehicle-mounted performance thereof is deteriorated.

Moreover, because the multiple sensors are connected with the determining unit respectively via the multiple wires, not only the wire number but also the whole wire length increases. Thus, the cost becomes high.

However, if the communication paths are bus-connected to collectively connect the multiple sensors with the determining unit, an abnormality in one of the communication paths will influence the detection signals of the multiple sensors which are connected with the one communication path. Thus, a faulty determination of the determining unit will be caused.

SUMMARY OF THE INVENTION

In view of the above-described disadvantages, it is an object of the present invention to provide a passenger protecting system, in which a faulty determination is restricted and a vehicle-mounted performance is improved.

According to the present invention, a passenger protecting system has at least two sensors which detect an impact to a vehicle due to a collision, a determining unit for determining the collision of the vehicle based on detection signals of the sensors, and a communication unit through which the sensors are connected with the determining unit so that the detection signals of the sensors are transmitted to the determining unit. The detection signal of one of the sensors has a reverse polarity with respect to that of other of the sensors.

Thus, the two sensors which respectively generate the detection signals having the polarities reverse to each other are transmitted to the determining unit through the communication unit. Therefore, when there occurs a fixedness or the like at the detection signal due to a fault in the communication path where the sensors are connected, the detection signal of one of the sensors will be restricted from larger than or equal to a predetermined threshold value thereof. Accordingly, the determining unit can be restricted from a faulty determination.

Preferably, the communication unit constructs a single communication path, through which the at least two sensors are connected with the determining unit in series.

Therefore, even when the sensor number of the passenger protection system is increased, it is unnecessary to append the communication path. Accordingly, the passenger protection system can be restricted from being large-sized. Moreover, the wiring can be simplified.

BRIEF DESCRIPTION OF THE DRAWINGS

Other objects, features and advantages of the present invention will become more apparent from the following detailed description made with reference to the accompanying drawings, in which:

FIG. 1 is a schematic view showing a passenger protecting system according to a first embodiment of the present invention;

FIG. 2 is a schematic view showing a construction of the passenger protecting system in the proximity of an ECU thereof according to the first embodiment;

DETAILED DESCRIPTION OF THE EXAMPLE EMBODIMENTS

First Embodiment

Figure 3:
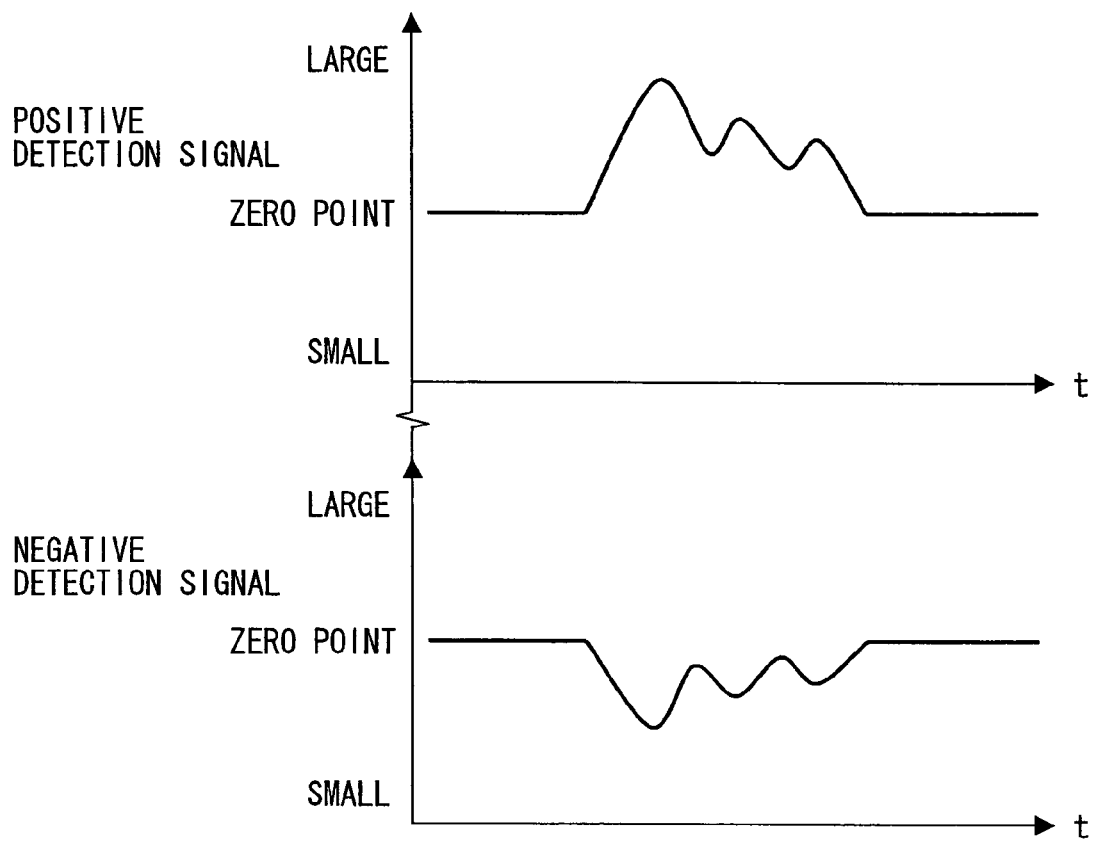
FIG. 3 is a diagram showing detection signals of sensors of the passenger protecting system according to the first embodiment.

A passenger protecting system according to a first embodiment of the present invention will be described with reference to FIGS. 1-6. The passenger protecting system can be suitably used to protect a passenger from a side-impact collision of a vehicle or the like.

As shown in FIG. 1, the passenger protecting system has a determining unit 1 (e.g., ECU), multiple detection units (e.g., two sensors 21 and 22), a communication unit and a passenger protecting unit (not shown). The communication unit can be constructed of bus lines B1 and B2, for example.

The ECU 1 (electronic control unit) can be arranged at a substantially center of the vehicle to determine a collision (e.g., side-impact collision) of the vehicle and control an actuation of the passenger protecting unit. Referring to FIG. 2, the ECU 1 has a circuit board 10 and a calculation device 11 (CPU), which is mounted at the circuit board 10.

The sensors 21 and 22 (satellite sensors) are arranged outside of the ECU 1 and mounted at different positions of the vehicle. The sensor 21, 22 can be constructed of an acceleration sensor, a pressure sensor or the like, to detect an alteration of the vehicle due to an impact (e.g., in vehicle width direction) of thereof. The acceleration sensor detects an acceleration of the vehicle, for example, a lateral acceleration in the vehicle width direction. The pressure sensor detects an internal pressure of a door of the vehicle or the like. Thus, the collision of the vehicle can be detected according to the acceleration or the internal pressure variation (due to deformation of the door) or the like which is caused by the collision.

The sensor 21 (first-row left side sensor) can be positioned at a left side of a first-row seat (i.e., assistant seat) of the vehicle. That is, the sensor 21 is arranged in the proximity of a left B-pillar of the vehicle. The sensor 22 (second-row left side sensor) can be positioned at a left side of a second-row seat (i.e., seat at rear side of assistant seat) of the vehicle. That is, the sensor 22 is arranged near a left C-pillar of the vehicle.

The sensors 21 and 22 respectively construct main sensors for determining collisions in the proximity of the attachment positions thereof.

The bus line B1 connects the ECU 1 with the sensor 21, and the bus line B2 connects the sensor 21 with the sensor 22. That is, the sensors 21, 22 and the ECU 1 are connected with each other in series, via the bus lines B1 and B2.

As shown in FIG. 2, the bus line B1 is connected with the CPU 11 via a bus interface I/F1 (first interface) which is arranged at the circuit board 10. That is, detection signals (e.g., acceleration signals) from the sensors 21 and 22 are inputted into the CPU 11 through the I/F1. In this case, the I/F1 and the bus lines B1, B2 constructs a single communication path, through which the sensors 21 and 22 are connected with the CPU 11 (which corresponds to determining device).

The passenger protecting unit is actuated via an actuation signal, which is generated by the ECU 1 when it is determined that a collision of the vehicle occurs. The passenger protecting unit can include a right side bag, a left side bag, a right curtain bag, a left curtain bag, a right pretensional, a left pretensional and the like.

As described above, the first-row left side sensor 21 and the second-row left side sensor 22 respectively construct the main sensors for determining the collisions in the proximity of the attachment positions thereof. Moreover, the sensor 21 doubles as a safing sensor (sub sensor) for determining the collision in the proximity of the left side of the second-row seat (i.e., attachment position of sensor 22). The sensor 22 doubles as a safing sensor (sub sensor) for determining the collision in the proximity of the left side of the first-row seat (i.e., attachment position of sensor 21).

In this case, referring to FIG. 2, the main sensor and the safing sensor thereof are connected with each other through the bus line B2 and connected with the ECU 1 via the I/F1 through the bus line B1. That is, the main sensor and the safing sensor thereof are communicated with the ECU 1 via the identical communication path.

The safing sensor (sub sensor) means a sensor for detecting an impact (due to collision of vehicle) which is less than that detected by the main sensor. Moreover, the safing sensor (sub sensor) can be also constructed to detect a phase difference between the detection signal of the safing sensor and that of the main sensor so that the collision is determined.

FIG. 3 shows the detection signals of the first-row left side sensor 21 and the second-row left side sensor 22 when there occurs the collision in the proximity of the sensor 21. Referring to FIG. 3, the sensor 21 outputs electrical signals (detection signals) of a positive side (that is, side where output is larger than zero point signal), when there occurs the collision from the left side of the vehicle. The sensor 22 outputs electrical signals (detection signals) of a negative side (that is, side where output is smaller than the zero point signal) when there occurs the collision from the left side of the vehicle. That is, the detection signal of the sensor 21 has a reverse polarity to that of the sensor 22.

Figure 4:
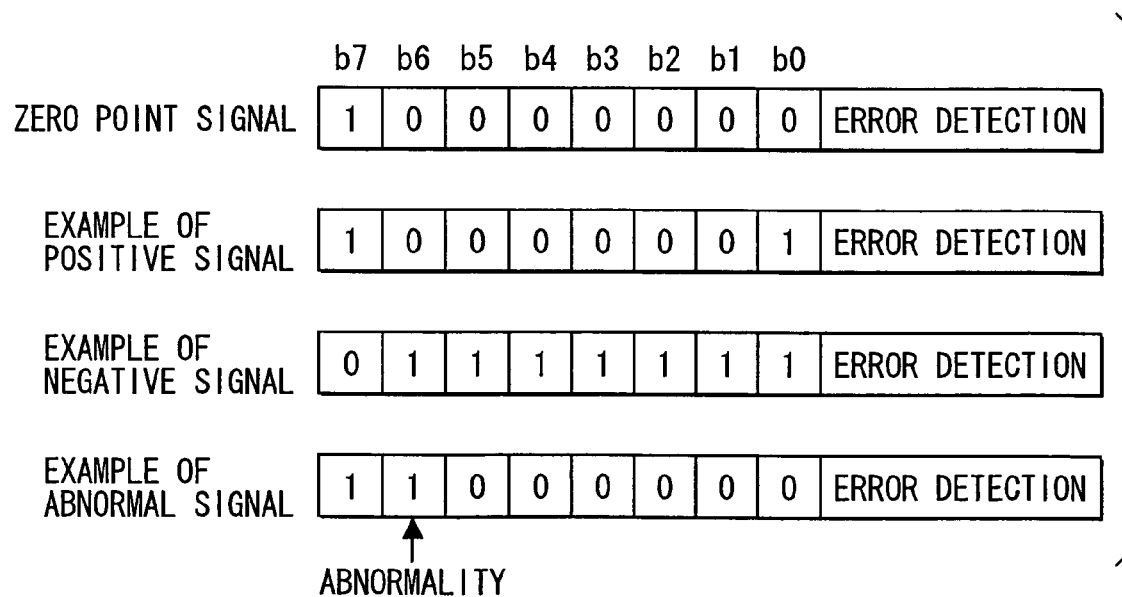
FIG. 4 is a diagram showing exampled compositions of the detection signals of the sensors of the passenger protecting system according to the first embodiment.

Specifically, FIG. 4 shows the exampled detection signals of the sensors 21 and 22. The detection signal of the sensor 21, 22 includes a 8-bit signal and an error detection bit, which can be constructed of a checksum or a CRC as wall-known. The zero point signal (e.g., 0 m/s$^2$ signal for acceleration signal) of the sensor 21, 22 can be set as 10000000b. The positive signal is larger than 10000000b and the negative signal is smaller than 10000000b.

Next, the operation of the passenger protecting system according to the first embodiment will be described.

The CPU 11 acquires (captures) the detection signals of the first-row left side sensor 21 and the second-row left side sensor 22 at a periodicity of 0.5 ms, for example. When a collision occurs, the acceleration or the like (in vehicle width direction, for example) is detected via the sensors 21 and 22. The detection signals of the sensors 21 and 22 are inputted into the CPU 11. Then, the CPU 11 determines whether or not there occurs the collision with, for example, the left side of the first-row seat and/or the left side of the second-row seat of the vehicle based on the inputted acceleration signals.

Figure 5:
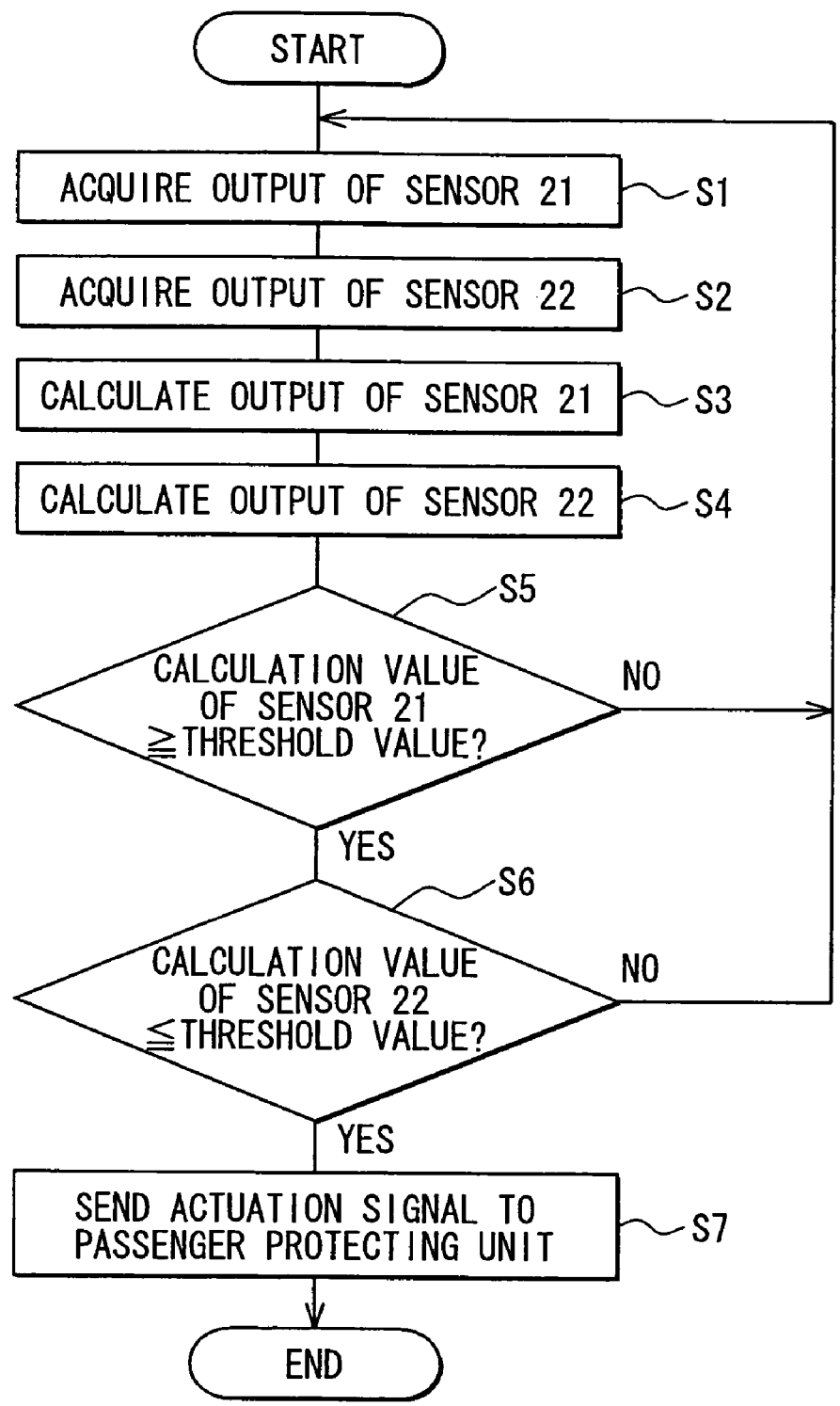
FIG. 5 is a flow chart showing a determining method for a side-impact collision of the passenger protecting system according to the first embodiment.

For example, the ECU 1 can perform a process shown in FIG. 5 according to a program which is beforehand memorized in the ECU 1. In this case, at first, at steps S1 and S2, the outputs (e.g., detected acceleration signals) of the first-row left side sensor 21 and the second-row left side sensor 22 are inputted into the CPU 11 of the ECU 1. Then, at steps S3 and S4, the CPU 11 respectively calculates the accelerations detected by the sensor 21 and the sensor 22.

Then, at step S5, the calculated value of the sensor 21 is compared with predetermined threshold values of the sensor 21, that is, a main-determination threshold value and a safing-determination threshold value of the sensor 21.

That is, at step S5, it is determined whether or not the calculated value of the sensor 21 is larger than or equal to the main-determination threshold value thereof, and whether or not the calculated value of the sensor 21 is larger than or equal to the safing-determination threshold value thereof.

In the case where it is determined that the calculated value of the sensor 21 is smaller than the main-determination threshold value and the safing-determination threshold value thereof (that is, step S5 is "NO"), the process will be repeated from step S1. On the other hand, in the case where it is determined that the calculated value of the sensor 21 is larger than or equal to at least one of the main-determination threshold value and the safing-determination threshold value thereof (that is, step S5 is "YES"), step S6 will be performed.

At step S6, the calculated value of the sensor 22 is compared with predetermined threshold values of the sensor 22, that is, a safing-determination threshold value of the sensor 22 and a main-determination threshold value of the sensor 22.

That is, at step S6, it is determined whether or not the calculated value of the sensor 22 is smaller than or equal to the main-determination threshold value thereof, and whether or not the calculated value of the sensor 22 is smaller than or equal to the safing-determination threshold value thereof.

In the case where it is determined at step S6 that the calculated value of the sensor 22 is larger than the safing-determination threshold value thereof and the main-determination threshold value thereof (that is, step S6 is "NO"), the process will be repeated from step S1.

On the other hand, in the case where it is determined at step S5 that the calculated value of the first-row left side sensor 21 is larger than or equal to the main-determination threshold value of the sensor 21 and it is determined at step S6 that the calculated value of the second-row left side sensor 22 is smaller than or equal to the safing-determination threshold value of the sensor 22 (that is, step S6 is "YES"), the ECU 1 determines that there occurs the collision with the left side of the first-row seat of the vehicle.

In the case where it is determined at step S5 that the calculated value of the first-row left side sensor 21 is larger than or equal to the safing-determination threshold value of the sensor 21 and it is determined at step S6 that the calculated value of the second-row left side sensor 22 is smaller than or equal to the main-determination threshold value of the sensor 22 (that is, step S6 is "YES"), the ECU 1 determines that there occurs the collision with the left side of the second-row seat of the vehicle.

When the ECU 1 determines that there occurs the collision with the left side of the first-row seat and/or with the left side of the second-row seat of the vehicle, the ECU 1 generates the actuation signal to actuate the passenger protecting unit at step S7. Then, the process shown in FIG. 5 is ended. The process can be repeated at a predetermined periodicity.

Alternatively, the ECU 1 can also respectively determine the collisions of the left side of the first-row seat and that of the second-row seat of the vehicle, by performing the process shown in FIG. 5 for two times during the one periodicity of the process. For example, in the first-time performing of the process (for determining collision of left side of first-row seat), the calculated value of the sensor 21 is compared with the main-determination threshold value of the sensor 21 at step S5, and the calculated value of the sensor 22 is compared with the safing-determination threshold value of the sensor 22 at step S6. Then, in the second-time performing of the process (for determining collision of left side of second-row seat), the calculated value of the sensor 21 is compared with the safing-determination threshold value of the sensor 21 at step S5, and the calculated value of the sensor 22 is compared with the main-determination threshold value of the sensor 22 at step S6.

The acceleration calculation can be performed via an interval integral or the like as well known, to be omitted here.

Next, the case where an abnormality (fault) occurs in the I/F1 or the like will be described. The I/F1 has therein an error detection unit, a buffer and registers, which are not shown in figures. The error detection unit checks whether or not the received signals (data) are correct. For example, in the case where the detection signal of the sensor 21, 22 is bit-garbled due to an influence of electrical noise upon the bus line B1, B2 or the like, the error detection unit will detect the abnormality. Thus, a flag is set at one of the registers to inform the CPU 11 that the received data are abnormal data.

The buffer can accumulate the multiple received data. The data accumulated in the buffer are sent to the CPU 11 via the other of the registers in a receiving-time sequence thereof. That is, the datum which is earlier received will be earlier sent to the CPU 11 via the other register. The data having been sent via the other register are deleted from the buffer.

Generally, the other register is provided with a one-datum capacity. Therefore, in the case where there occurs the fault that some bit of this register becomes fixed, the identical bit of all of the received data will become similarly fixed. That is, the identical bit of the data of the sensors 21 and 22 which are connected to the identical communication path will become fixed. In this case, because the data have been checked via the error detection unit, the CPU 11 is not informed of the fixedness abnormality.

According to this embodiment, the polarity of the detection signal of the sensor 22 is reverse with respect to that of the detection signal of the sensor 21. In the case where the fixedness of the register in the I/F1 occurs at the positive side, for example, the bit 6 (b6) becomes fixed at "1", it becomes possible for the calculated acceleration value of the sensor 21 to become larger than or equal to the main-determination threshold value and the safing-determination threshold value of the sensor 21.

In this case, because the polarity of the detection signal of the sensor 22 is reverse to that of the sensor 21, the main-determination threshold value and the safing-determination threshold value of the sensor 22 are set to detect the signal of the negative side. Thus, even when the signal of the positive side is garbled due to the bit fixedness, the calculated acceleration value of the sensor 22 will not become smaller than or equal to the main-determination threshold value and the safing-determination threshold value of the sensor 22.

Similarly, in the case where a fixedness of the register of the I/F1 occurs at the negative side, the calculated acceleration value of the first-row left side sensor 21 will not become larger than or equal to the main-determination threshold value and the safing-determination threshold value of the sensor 21.

Therefore, in the passenger protecting system according to this embodiment, a faulty determination of the side-impact collision or the like can be restricted when the fault occurs in the I/F circuit, for example. Therefore, the CPU 11 can be restricted from generating a faulty actuation signal. Accordingly, the misoperation of the passenger protecting unit can be reduced.

Next, modifications of the first embodiment will be described.

For example, the polarities of the detection signals of the sensor 21 and the sensor 22 can be set reverse to those set in the first embodiment. That is, the sensor 21 can be set to output the negative signal and the sensor 22 can be set to output the positive signal. In this case, the collision can be determined similarly to what is described in the first embodiment.

Furthermore, the arrangement position of the sensor 21, 22 at the vehicle is not limited. For example, the sensor 21 can be constructed of the pressure sensor (for detecting internal-pressure of door) and arranged in the door of the left side of the first-row seat of the vehicle. The sensor 22 can be constructed of the acceleration sensor and positioned in the proximity of the B-pillar of the left side of the first-row seat of the vehicle.

Moreover, the passenger protecting system according to this embodiment can be also suitably used for the case where there occurs a collision with the right side of the vehicle.

Figure 6:
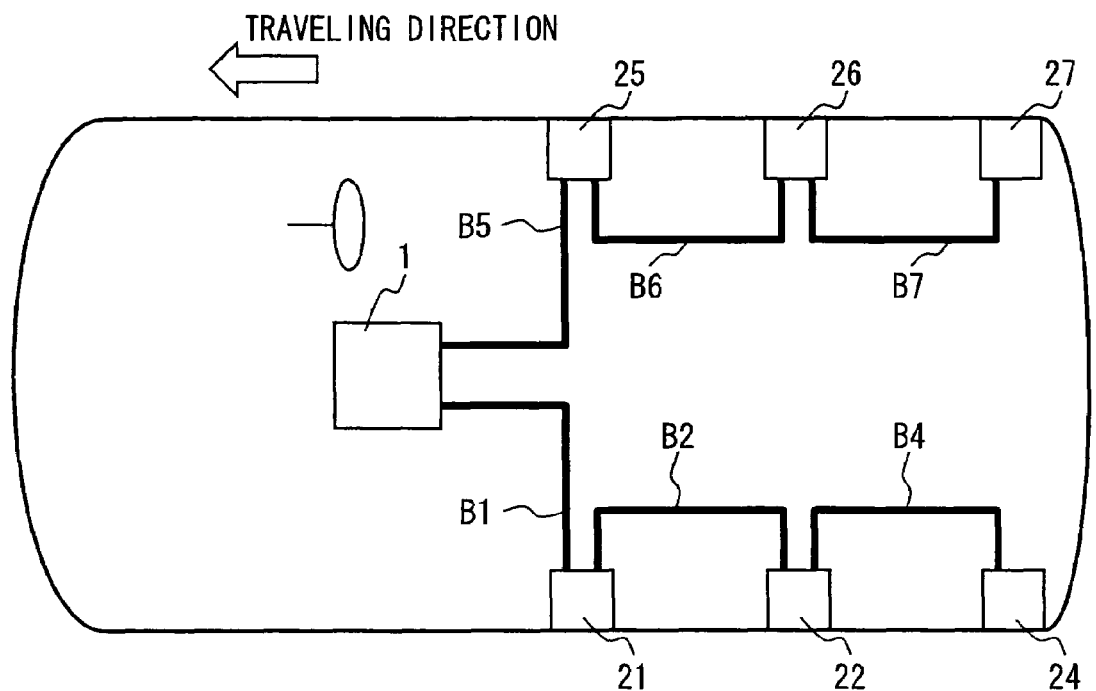
FIG. 6 is a schematic view showing a passenger protecting system according to a modification of the first embodiment.

Referring to FIG. 6, the passenger protecting system can be further provided with a third-row left side sensor 24, in addition to the sensors 21 and 22 shown in FIG. 1. The sensor 24 is arranged at the left side of the third-row seat of the vehicle, that is, in the proximity of a left D-pillar of the vehicle, and connected with the second-row left side sensor 22 via a bus line B4. In this case, the I/F1 and the bus lines B1, B2 and B4 are arranged in the identical communication path. The sensors (e.g., 22 and 24) which are adjacent to each other construct the main sensor and the safing sensor, to detect the impact at the arrangement position of the main sensor. The polarity of the detection signal of the second-row left side sensor 22 is reversed to those of the first-row left side sensor 21 and the third-row left side sensor 24. Thus, the collision with the vehicle can be determined similarly to what described above.

In addition to the sensors 21, 22 and 24, referring to FIG. 6, the passenger protecting system can be further provided with a sensor 25 (first-row right side sensor) which is arranged at a right side of the first-row seat of the vehicle, a sensor 26 (second-row right side sensor) which is arranged at a right side of the second-row seat of the vehicle, and a sensor 27 (third-row right side sensor) which is arranged at a right side of the third-row seat of the vehicle. In this case, the ECU 1 further has a bus interface I/F2 (second interface which is not shown), which is arranged at the circuit board 10 of the ECU 1 and connected with the sensor 25 via a bus line B5. The sensors 25 and 26 are connected with each other via a bus line B6. The sensors 26 and 27 are connected with each other via a bus line B7. The detection signals of the sensors 25-27 are taken into the CPU 11 via the I/F2, so that the collision of the right side of the vehicle can be determined. Similar to the sensors 21, 22 and 24, the polarity of the detection signal of the sensor 26 is reversed to those of the sensors 25 and 27.

Thus, the collision of the right side of the vehicle can be detected based on the detection signals of the sensors 25-27, similarly to the case of the collision of the left side of the vehicle as described above.

Second Embodiment

A second embodiment of the present invention will be described with reference to FIGS. 7 and 8.

Figure 7:
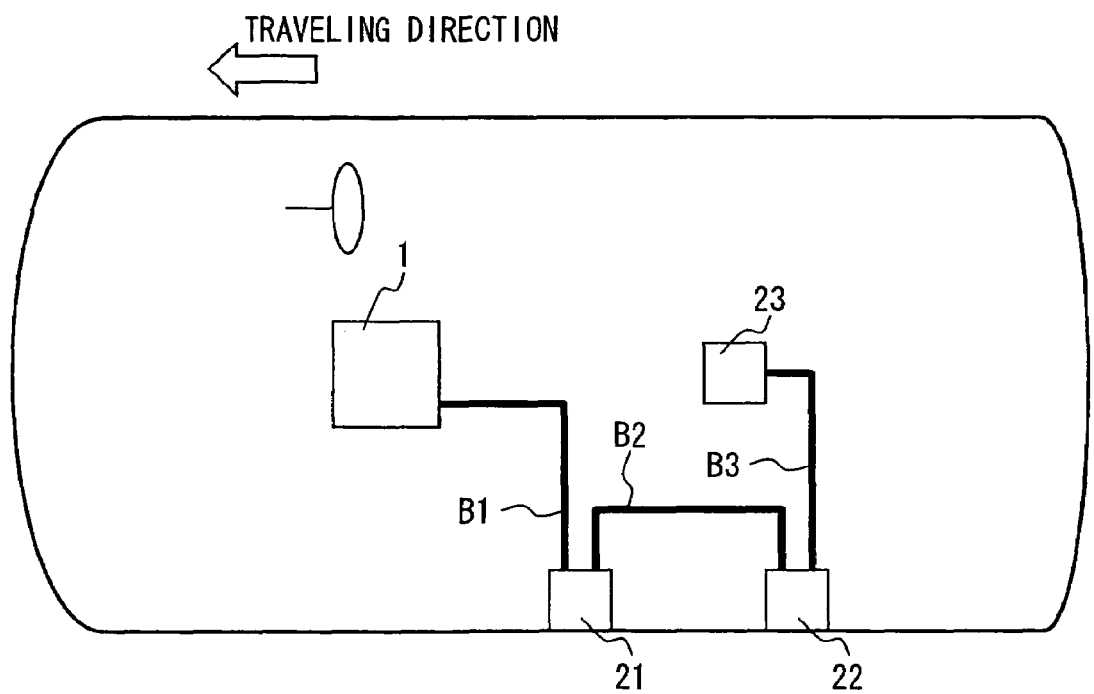
FIG. 7 is a schematic view showing a passenger protecting system according to a second embodiment of the present invention.

According to the second embodiment, referring to FIG. 7, the passenger protecting system is further provided with a sensor 23 (e.g., lateral acceleration sensor), in addition to the sensors 21 and 22 shown in FIG. 1. The lateral acceleration sensor 23 is connected with the second-row left side sensor 22 via a bus line B3. That is, the I/F1 and the bus lines B1-B3 are arranged in the identical communication path.

The lateral acceleration sensor 23 can be arranged on a substantially central line (of vehicle width direction) of the vehicle, and positioned at a vehicle rear side (with respect to vehicle traveling direction) of the ECU 1. Specifically, the lateral acceleration sensor 23 is arranged, for example, at a substantial middle (of vehicle-longitudinal-direction) between the first-row left side sensor 21 and the second-row left side sensor 22. The vehicle width direction corresponds to the vehicle left-right direction. The vehicle longitudinal direction (vehicle traveling direction) corresponds to the vehicle front-rear direction.

In this embodiment, the first-row left side sensor 21 and the second-row left side sensor 22 are the main sensors for respectively determining the collisions in the proximity of the attachment positions thereof. The lateral acceleration sensor 23 constructs the safing sensor of the sensors 21 and 22, for determining the collisions in the proximity of the attachment positions of the sensors 21 and 22. In this case, the main sensor and the safing sensor are connected to the identical communication path.

Each of the first-row left side sensor 21 and the second-row left side sensor 22 is arranged to output the positive signal (which is larger than zero point signal) when there occurs the collision with the left side of the vehicle. The lateral acceleration sensor 23 is arranged to output the negative signal (which is smaller than zero point signal) when there occurs the collision with the left side of the vehicle.

Next, the operation of the passenger protecting system according to the second embodiment will be described.

At first, the case where there occurs the collision with the left side of the first-row seat of the vehicle is described.

The CPU 11 is arranged to acquire the detection signals of the sensors 21-23 at a periodicity of 0.5 ms, for example. Thus, the signals of the vehicle-width-direction acceleration or the like detected by the sensors 21 and 23 can be inputted into the CPU 11 when a collision happens. Thus, the CPU 11 determines whether or not there occurs the collision with the left side of the first-row seat of the vehicle based on the acceleration signals inputted into the CPU 11.

Specifically, referring to FIG. 5, the acceleration signals detected by the sensors 21 and 23 are inputted into the CPU 11. The CPU 11 calculates the accelerations detected by the sensors 21 and 23. Then, the calculated value of the sensor 21 and that of the sensor 23 are respectively compared with a predetermined main-determination threshold value of the sensor 21 and a predetermined safing-determination threshold value of the sensor 23. In the case where the calculated value of the sensor 21 is larger than or equal to the main-determination threshold value of the sensor 21 and the calculated value of the lateral acceleration sensor 23 is smaller than or equal to the safing-determination threshold value of the sensor 23, it is determined that there occurs the collision with the left side of the first-row seat of the vehicle.

In this case, the acceleration calculation can be performed by an interval integral or the like as well known, to be omitted here.

Similarly, the case where there occurs the collision with the left side of the second-row seat of the vehicle will be described. As described above, the CPU 11 acquires the detection signals of the sensors 21-23 at a periodicity of 0.5 ms, for example. Thus, the signals of the vehicle-width-direction acceleration or the like detected by the sensors 22 and 23 can be inputted into the CPU 11 when a collision happens. In this case, the CPU 11 determines whether or not there occurs the collision with the left side of the second-row seat of the vehicle based on the acceleration signals which are inputted therein from the sensors 22 and 23.

Specifically, the acceleration signals detected by the second-row left side sensor 22 and the lateral acceleration sensor 23 are inputted into the CPU 11. Then, the CPU 11 calculates the accelerations detected by the sensors 22 and 23.

The calculated value of the second-row left side sensor 22 and that of the lateral acceleration sensor 23 are respectively compared with a predetermined main-determination threshold value of the sensor 22 and the predetermined safing-determination threshold value of the sensor 23. In the case where the calculated value of the sensor 22 is larger than or equal to the main-determination threshold value of the sensor 22 and the calculated value of the sensor 23 is smaller than or equal to the safing-determination threshold value of the sensor 23, it is determined that there occurs the collision with the left side of the second-row seat of the vehicle.

When it is determined that there occurs the collision with the left side of the first-row seat and/or that of the second-row seat of the vehicle, the ECU 1 sends the actuation signal to the passenger protecting unit. Thus, the passenger protecting unit is actuated.

Next, the case where some bit of the sensor detection signal becomes fixed due to a fault of the I/F1 will be described.

According to this embodiment, the polarity of the detection signal of the lateral acceleration sensor 23 is reverse to those of the detection signal of the second-row left side sensor 22 and that of the first-row left side sensor 21. In the case where the fixedness of the register in the I/F1 is at the positive side, for example, the bit 6 (b6) becomes fixed at "1", it becomes possible for the calculated acceleration values of the sensor 21 and the sensor 22 to become respectively larger than the main-determination threshold values thereof.

Because the polarity of the detection signal of the sensor 23 is reverse to those of the sensors 21 and 22, the safing-determination threshold value of the sensor 23 is set to detect the negative signal. Thus, even when the positive signal of the sensor 21, 22 is garbled due to the bit fixedness, the calculated acceleration value of the sensor 23 will not become smaller than or equal to the safing-determination threshold value of the sensor 23.

Similarly, in the case where a fixedness of the register in the I/F1 occurs at the negative side, the calculated acceleration value of the sensor 21 will not become larger than or equal to the main determination threshold value of the sensor 21, and the calculated acceleration value of the sensor 22 will not become larger than or equal to the main determination threshold value of the sensor 22.

Therefore, in the passenger protecting system according to this embodiment, the faulty determination of the side-impact collision is restricted when a fault occurs in the I/F circuit. Therefore, the faulty actuation signal sent by the CPU 11 to the passenger protecting unit can be reduced. Accordingly, the misoperation of the passenger protecting unit can be restricted.

Next, modifications of the second embodiment will be described.

For example, the polarities of the detection signals of the sensors 21-23 can be set reverse to those in the second embodiment. That is, each of the sensors 21 and 22 is arranged to output the negative signal when there occurs the collision with the left side of the vehicle. The sensor 23 is arranged to output the positive signal when there occurs the collision with the left side of the vehicle. In this case, the collision can be determined similarly to what is described in the second embodiment.

The sensor 21, 22, 23 can be also constructed of other sensor which is capable of detecting the alteration of the vehicle due to an impact (e.g., in vehicle width direction) thereto. For example, the sensor 23 can be constructed of the pressure sensor for detecting the internal pressure of the door of the vehicle.

Furthermore, the arrangement position of the sensors 21-23 is not limited. For example, the sensor 21 can be constructed of the pressure sensor and positioned in the door of the left side of the first-row seat of the vehicle. The sensor 22 can be constructed of the acceleration sensor and positioned in the proximity of the B-pillar of the left side of the first-row seat of the vehicle.

The passenger protecting system according to this embodiment can be also suitably used for the collision with the right side of the vehicle.

Figure 8:
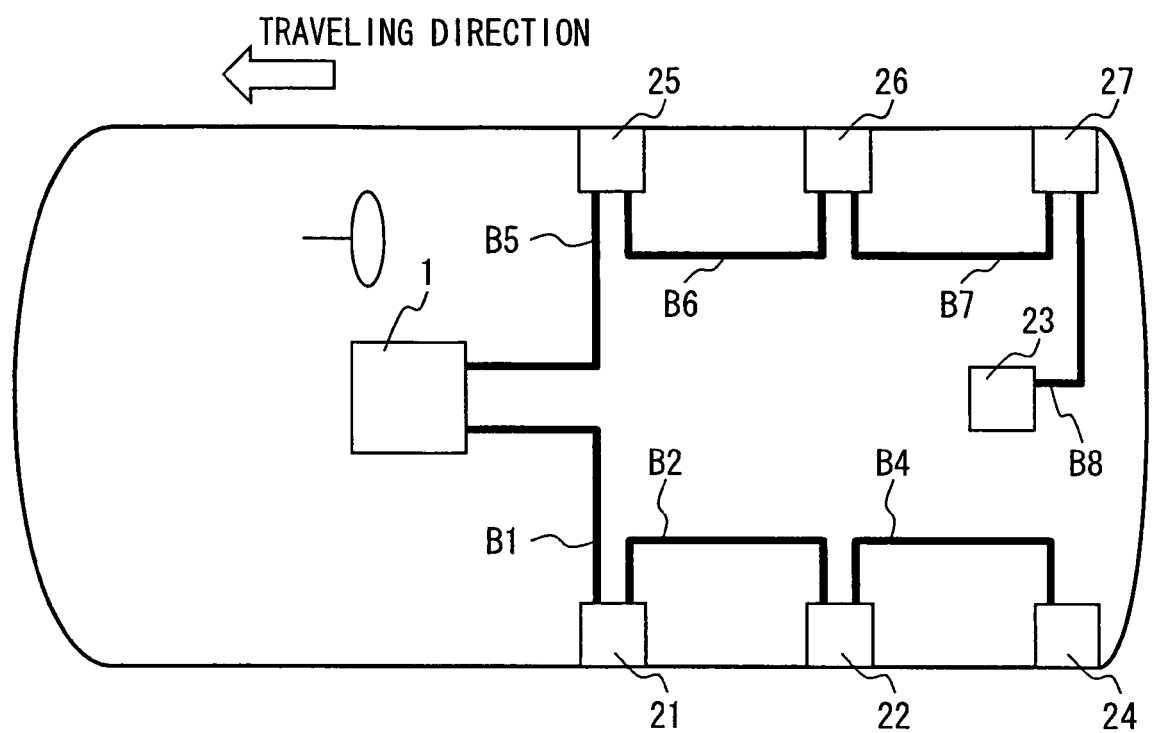
FIG. 8 is a schematic view showing a passenger protecting system according to a modification of the second embodiment.

Referring to FIG. 8, the passenger protecting system can be further provided with the sensor 23 (e.g., lateral acceleration sensor), in addition to the sensors 21, 22, 24-27 shown in FIG. 6. The lateral acceleration sensor 23 is connected with the third-row right side sensor 27 via a bus line B8. The sensors 23, 25-27 and the ECU 1 are connected with each other in series through the bus lines B5-B8. That is, the bus lines B5-B8 and the I/F2 (not shown) are arranged in the identical communication path. In this case, the lateral acceleration sensor 23 is used as the safing sensor of at least the sensors 22, 24, 26 and 27, for determining the collisions of the vehicle in the proximity of the attachment positions thereof. In this case, the collision can be detected similarly to what is described in the second embodiment.

In the above-described embodiments, the method for reversing the sensor detection signal is not limited.

For example, the detection direction of the sensor (which detection signal is to be reversed) in the casing thereof is set same with that of the other sensor, while the orientation of the casing of the sensor arranged in vehicle is reversed to that of the other sensor.

Alternatively, the orientation of the sensor (which detection signal is to be reversed) can be changed so that the detection direction of the sensor in the casing thereof is reversed. In this case, the orientation of the casing of the sensor is same with that of the other sensor.

More alternatively, the two kinds of sensors can be provided. The sensors are respectively capable of outputting the positive signal and the negative signal when being provided with the same orientation. The sensors with the same orientation are arranged in the casings thereof. The orientations of the casings of the sensors are also same with each other.

Other Embodiments

Although the present invention has been fully described in connection with the preferred embodiments thereof with reference to the accompanying drawings, it is to be noted that various changes and modifications will become apparent to those skilled in the art.

In the passenger protecting system according to the above-described embodiments, it can be also determined that there occurs the collision with the vehicle in the case where the calculated value of the sensor is larger (or smaller) than the predetermined threshold value of the sensor. For example, referring to FIG. 7, it can be also determined that there occurs the collision at the left side of the first-row seat of the vehicle, in the case where the calculated value of the first-row left side sensor 21 is larger than the main-determination threshold value of the sensor 21 and the calculated value of the lateral acceleration sensor 23 is smaller than the safing-determination threshold value of the sensor 23.

Such changes and modifications are to be understood as being in the scope of the present invention as defined by the appended claims.

What is claimed is:

1. A passenger protecting system comprising:
    at least two sensors which detect an impact to a vehicle due to a collision;
    a determining unit for determining the collision with the vehicle based on detection signals of the sensors; and
    a communication unit through which the sensors are connected with the determining unit so that the detection signals of the sensors are transmitted to the determining unit, wherein
    the sensors detect the impact in a width direction of the vehicle and are prepared so that the detection signal of one of the sensors has a reverse polarity with respect to the detection signal of other of the sensors, and wherein
    when one of the sensors sends a positive detection signal and other of the sensors sends a negative detection signal, the determining unit determines there occurs the collision in the case where the detection signal of the one of the sensors is larger than or equal to a predetermined threshold value of the one of the sensors and the detection signal of the other of the sensors is smaller than or equal to a predetermined threshold value of the other of the sensors.

2. The passenger protecting system according to claim 1, wherein:
one of the sensors is a main sensor and attached to the vehicle at one side of the width direction of the vehicle;
other of the sensors is a sub sensor and arranged at a substantial width-direction center of the vehicle; and
the determining unit determines whether or not there occurs the collision in the proximity of an attachment position of the main sensor based on the detection signals of the main sensor and the sub sensor.

3. The passenger protecting system according to claim 2, wherein each of the sensors is an acceleration sensor.

4. The passenger protecting system according to claim 2, wherein
the one of the sensors is a pressure sensor for detecting an internal pressure of a door of the vehicle, and the other of the sensors is an acceleration sensor.

5. The passenger protecting system according to claim 1, further comprising
a passenger protecting unit, which is actuated to protect a passenger in the vehicle when the determining unit determines that there occurs the collision.

6. The passenger protecting system according to claim 1, wherein
the at least two sensors and the determining unit are connected with each other in series via the communication unit, which constructs a single communication path.

7. The passenger protecting system according to claim 6, wherein
the communication unit includes at least two bus lines for connecting the at least two sensors with the determining unit.

8. The passenger protecting system according to claim 7, wherein
the determining unit has a determining device for determining the collision, and a bus interface through which the communication path is connected with the determining device.

9. The passenger protecting system according to claim 1, wherein
the one of the sensors is positioned to have a reverse detection direction with respect to the other of the sensors, so that the detection signal of the one of the sensors has the reverse polarity.

10. The passenger protecting system according to claim 1, wherein
the one of the sensors is constructed to output the detection signal having the reverse polarity when being provided with a same detection direction with the other of the sensors.

11. A passenger protecting system comprising:
at least two sensors which detect an impact to a vehicle due to a collision;
a determining unit for determining the collision with the vehicle based on detection signals of the sensors; and
a communication unit through which the sensors are connected with the determining unit so that the detection signals of the sensors are transmitted to the determining unit, wherein
the sensors detect the impact in a width direction of the vehicle and are prepared so that the detection signal of one of the sensors has a reverse polarity with respect to the detection signal of other of the sensors, and wherein
the two sensors are attached to the vehicle at different positions of a longitudinal direction of the vehicle, and arranged at one side of the width direction of the vehicle; and
the determining unit determines whether or not the collision occurs in the proximity of an attachment position of one of the sensors based on the detection signals of both of the sensors.

* * * * *